United States Patent
Chan et al.

(10) Patent No.: US 8,019,766 B2
(45) Date of Patent: Sep. 13, 2011

(54) PROCESSES FOR CALCULATING ITEM DISTANCES AND PERFORMING ITEM CLUSTERING

(75) Inventors: James D. Chan, Bellevue, WA (US); Kushal Chakrabarti, Kirkland, WA (US); George M. Ionkov, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 998 days.

(21) Appl. No.: 11/694,757

(22) Filed: Mar. 30, 2007

(65) Prior Publication Data

US 2008/0243816 A1 Oct. 2, 2008

(51) Int. Cl.
G06F 7/00 (2006.01)
(52) U.S. Cl. .................................. 707/740; 707/771
(58) Field of Classification Search ............... 707/737, 707/740
See application file for complete search history.

(56) References Cited

U.S. PATENT DOCUMENTS

| | | | |
|---|---|---|---|
| 5,933,818 A * | 8/1999 | Kasravi et al. ............... 706/12 |
| 6,029,195 A | 2/2000 | Herz | |
| 6,041,311 A | 3/2000 | Chislenko et al. | |
| 6,049,777 A | 4/2000 | Sheena et al. | |
| 6,092,049 A | 7/2000 | Chislenko et al. | |
| 6,356,879 B2 | 3/2002 | Aggarwal et al. | |
| 6,370,513 B1 | 4/2002 | Kolawa et al. | |
| 6,438,579 B1 | 8/2002 | Hosken | |
| 6,493,702 B1 | 12/2002 | Adar et al. | |
| 6,611,814 B1 | 8/2003 | Lee et al. | |
| 6,742,003 B2 | 5/2004 | Heckerman et al. | |
| 6,751,600 B1 | 6/2004 | Wolin | |
| 6,801,909 B2 | 10/2004 | Delgado et al. | |
| 6,912,505 B2 | 6/2005 | Linden et al. | |
| 7,051,048 B2 | 5/2006 | Sohma et al. | |
| 7,062,487 B1 | 6/2006 | Nagaishi et al. | |
| 7,080,059 B1 | 7/2006 | Poston et al. | |
| 7,533,093 B2 | 5/2009 | Gutta et al. | |
| 7,542,951 B1 | 6/2009 | Chakrabarti et al. | |
| 7,672,877 B1 | 3/2010 | Acton et al. | |
| 2002/0174119 A1 | 11/2002 | Kummamuru et al. | |
| 2002/0184139 A1 * | 12/2002 | Chickering et al. ............ 705/38 |
| 2003/0097196 A1 | 5/2003 | Gutta et al. | |
| 2003/0105682 A1 | 6/2003 | Dicker et al. | |
| 2003/0110181 A1 | 6/2003 | Schuetze et al. | |
| 2003/0158793 A1 | 8/2003 | Takakura et al. | |
| 2003/0172357 A1 | 9/2003 | Kao et al. | |
| 2003/0179236 A1 | 9/2003 | Good et al. | |
| 2003/0208399 A1 | 11/2003 | Basak et al. | |
| 2004/0015415 A1 | 1/2004 | Cofino et al. | |
| 2004/0093321 A1 | 5/2004 | Roustant et al. | |
| 2004/0181554 A1 * | 9/2004 | Heckerman et al. ....... 707/104.1 |
| 2005/0102202 A1 | 5/2005 | Linden et al. | |

(Continued)

OTHER PUBLICATIONS

Notification of concurrently-filed applications in one page.
U.S. Appl. No. 11/281,886, filed Nov. 17, 2005 (application text, drawings, and filing receipt provided).
International Search Report and Written Opinion in counterpart PCT application PCT/US 08/58762.

(Continued)

*Primary Examiner* — Charles Rones
*Assistant Examiner* — Mellissa M Chojnacki
(74) *Attorney, Agent, or Firm* — Knobbe, Martens, Olson & Bear LLP

(57) ABSTRACT

Computer-implemented processes are disclosed for clustering items, and for using item clusters to generate and/or present item recommendations. One process involves calculating distances between items based on how the items are categorized within a hierarchical browse structure. These distance calculations may then be used as a basis for forming clusters of items.

29 Claims, 9 Drawing Sheets

U.S. PATENT DOCUMENTS

| | | |
|---|---|---|
| 2005/0256866 A1 | 11/2005 | Lu et al. |
| 2005/0256867 A1 | 11/2005 | Walther et al. |
| 2006/0020614 A1 | 1/2006 | Kolawa et al. |
| 2006/0041548 A1 | 2/2006 | Parsons et al. |
| 2006/0161535 A1 | 7/2006 | Holbrook |
| 2006/0259344 A1 | 11/2006 | Patel et al. |
| 2007/0016575 A1 | 1/2007 | Hurst-Hiller et al. |
| 2007/0032244 A1 | 2/2007 | Counts et al. |
| 2007/0043688 A1 | 2/2007 | Kountz et al. |
| 2007/0078832 A1 | 4/2007 | Ott, IV et al. |
| 2007/0192308 A1 | 8/2007 | Wei et al. |
| 2008/0005064 A1 | 1/2008 | Sarukkai |
| 2008/0046343 A1 | 2/2008 | Maguire et al. |
| 2008/0114644 A1 | 5/2008 | Frank et al. |
| 2008/0189733 A1 | 8/2008 | Apostolopoulos |

OTHER PUBLICATIONS

International Search Report and Written Opinion in International Appl. PCT/US2008/058745, published as WO 2008/121872.

International Search Report and Written Opinion in International Appl. PCT/US2008/058762, published as WO 2008/121884.

Nairn, et al., Something approaching science? Cluster analysis procedures in a CRM era, Jun. 2003, International Journal of Market Research, 45, 2, 241 (23).

Schafer et al., "E-Commerce Recommendation Applications," Data Mining and Knowledge Discovery, vol. 5, Nos. 1-2, Jan. 2001, pp. 115-153.

* cited by examiner

PROCESSES FOR CALCULATING ITEM DISTANCES AND PERFORMING ITEM CLUSTERING

TECHNICAL FIELD

The present disclosure relates to methods for calculating distances between items, forming clusters of items, and using item clusters to generate more reliable item recommendations for users. Also disclosed are methods for organizing item recommendations for presentation to users.

BACKGROUND

Web sites and other types of interactive systems may implement recommendation services for recommending items stored or represented in a data repository. These services can operate, for example, by receiving an input list of items (optionally with associated item weights), and by outputting a ranked list of items that are collectively similar or related to the input set. The items included in the input set are referred to herein as "source items" or "sources."

One common application for recommendation services involves recommending products for purchase, rental, subscription, viewing or some other form of consumption. For example, e-commerce web sites commonly provide services for recommending products to users based on their respective purchase histories, rental histories, product viewing histories, and/or item ratings. Recommendation services are also commonly used to recommend web sites, articles, users, music and video files, and other types of items.

When generating recommendations for a particular user (referred to herein as the "target user"), the set of source items should ideally consist of items the target user likes. Otherwise, the recommendations may be of limited utility. Unfortunately, the task of reliably identifying such items without requiring explicit user input can be difficult. For example, although a user's purchase history as maintained by an e-commerce web site is typically very useful for generating recommendations, this purchase history may include items purchased by the user for others as gifts. Unless the user actually designated these items as gifts at the time of purchase, these items may be difficult to identify and filter out. As another example, the purchase history may include purchases made by multiple family members that share a home computer and account. The task of identifying appropriate source items is similarly difficult when the recommendations are based, e.g., on the item viewing histories, item rental histories, or item download histories of users.

To address this problem, some web sites allow users to view and "edit" their respective purchase histories, item viewing histories, and/or other item collections on an item-by-item basis, such as by rating, deleting, and/or tagging particular items. These edits are then taken into consideration in generating recommendations for the user. As one example, a user may delete from his or her purchase history all gift purchases, or may otherwise mark these items to indicate that they should not be used to generate recommendations. As another example, a user may tag the purchases that correspond to a particular family member or interest, and then request tag-specific recommendations that are based specifically on those purchases. In addition, some systems enable users to explicitly rate individual items that are recommended to them as "not interested."

While these "collection management" features can significantly improve the quality of the recommendations, many users do not take the time to review and manage their respective collections of items. Indeed, the task of reviewing and editing purchase histories and other item collections on an item-by-item basis can be burdensome. In addition, a user's interests might change over time, rendering some of the past item ratings inaccurate; for example, items rated by a user as "not interested" one year ago may not be relevant today. For these and other reasons, many users continue to receive recommendations that are not sufficiently tailored to their respective interests.

SUMMARY OF THE DISCLOSURE

Various computer-implemented processes and features are disclosed for using item clustering techniques to improve the utility of item recommendations provided to users. These processes may be implemented individually or in combination within a given computer system, such as, but not limited to, a web-based electronic catalog system.

One process involves applying a clustering algorithm to a user's purchase history or other collection of items. Information about the resulting clusters is then used—optionally in combination with other criteria—to select items to use as recommendation sources. For instance, items falling in a relatively small cluster may be excluded as sources on the basis that they likely represent gift purchases, or otherwise represent items falling outside the areas of interest of the user.

Another process involves displaying the clusters of items to the user via a collection management interface that enables the user to attach cluster-level metadata, such ratings or tags, to entire clusters of items. The resulting metadata may be used to improve the recommendations generated by a recommendation engine. For example, a user may explicitly or implicitly indicate that an entire cluster of items should be excluded from consideration in generating recommendations.

Another process involves forming clusters of items in which a user has indicated a lack of interest. These clusters are used to filter the output of a recommendation engine so as to remove items that may represent poor recommendations. Another process involves applying a clustering algorithm to the output of a recommendation engine to arrange the recommended items into cluster-based categories for presentation to the user.

Also disclosed is a process for calculating distances between particular items represented in a hierarchical browse structure, such as a tree or an acyclic graph. The calculated distances may be used as a basis for item clustering.

Neither this summary nor the following detailed description purports to define the invention. The invention is defined by the claims.

BRIEF DESCRIPTION OF THE DRAWINGS

Specific embodiments will now be described with reference to the drawings, which are intended to illustrate and not limit the various features of the invention.

DETAILED DESCRIPTION OF SPECIFIC EMBODIMENTS

Figure 1:
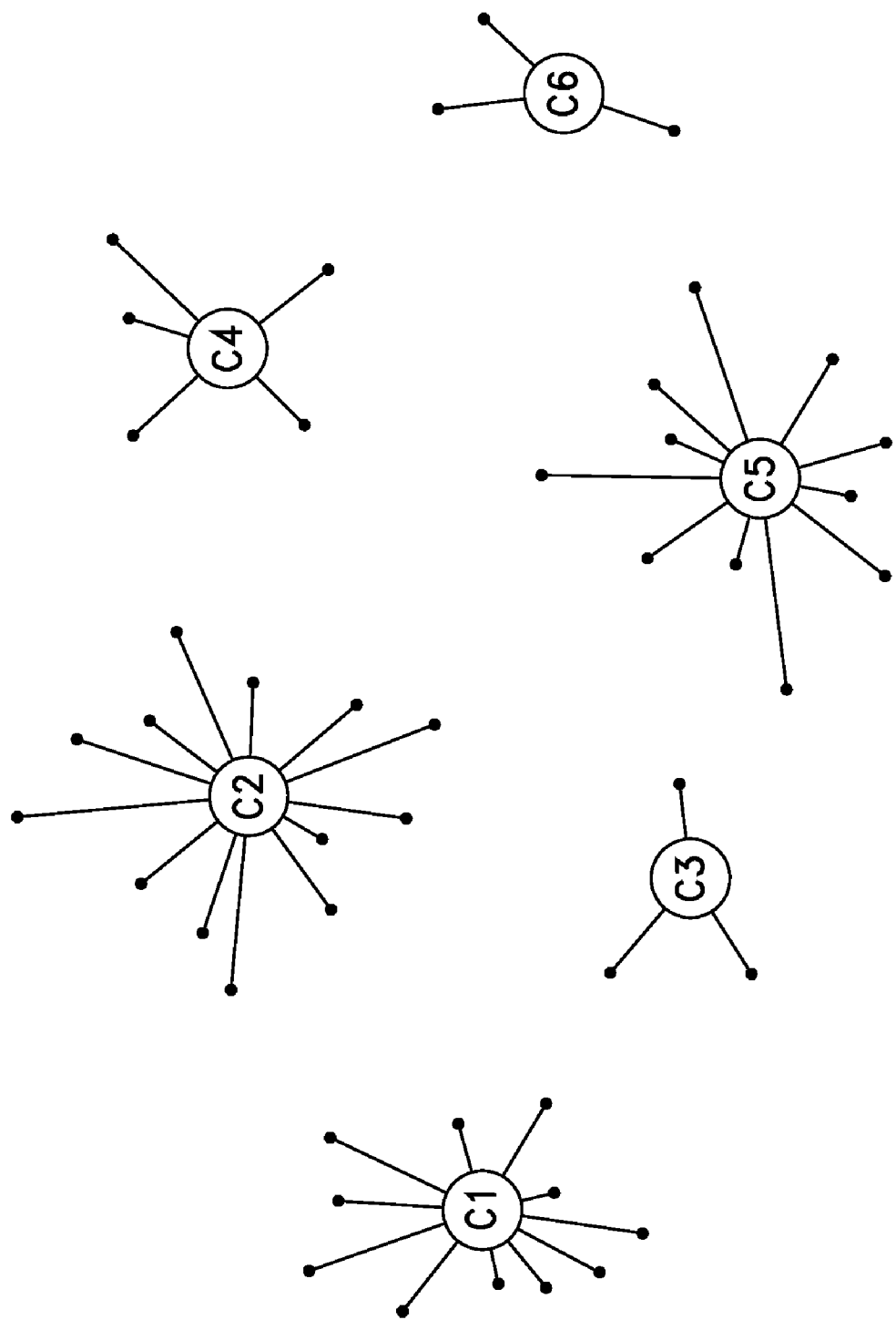
FIG. 1 illustrates a clustered representation of a user's purchase history or other item collection.

Several different computer-implemented processes will now be described for using clustering to improve item recommendations provided to users. These processes may be embodied individually or in any combination in a multi-user computer system ("system") that includes or uses a recommendation engine to generate personalized recommendations. A recommendation engine capable of selecting items to recommend to a user based on a set of source items may be used. The clustering and distance-calculation methods disclosed herein may also be used in applications that do not involve recommendations.

For purposes of illustration, the processes are described primarily in the context of a system that recommends catalog items to users of an e-commerce web site. As will be apparent, however, the disclosed processes can also be used to recommend other types of items, such as but not limited to web sites, news articles, blogs, travel destinations, service providers, other users, and events. In addition, the disclosed processes need not be implemented as part of, or in conjunction with, a web site.

This specification is arranged in the following sections:

Section I describes a process in which a user's collection of items, such as items in the user's purchase history, is subdivided into multiple clusters. These clusters are then analyzed to assess the user's interests, and are used (optionally in combination with other criteria) to select the "best" items to use as recommendation sources.

Section II describes a collection management interface, and associated methods, for enabling users to manage their item collections at a cluster level. In the illustrated embodiment, the interface enables the user to rate and/or tag entire clusters of items, and to request recommendations that are specific to a particular cluster.

Section III describes a process in which clusters are formed of items in which the user has indicated a lack of interest. These clusters are then used to filter the output of a recommendation engine.

Section IV describes a process for using clustering to organize the output of a recommendation engine by category for display to a user.

Section V displays how item distances (used for clustering) can be calculated based on locations of the items within a hierarchical browse structure, such as a directed acyclic graph.

Sections VI-VIII describe specific examples of clustering methods that may be used to implement the processes described in Sections I-IV.

Section IX describes one example of a system architecture for implementing the various processes in the context of a web site that hosts an electronic catalog.

The specific processes and components described in the following sections represent specific embodiments of the disclosed inventions, and are presented by way of example. As such, nothing in this description is intended to imply that any particular feature, step, characteristic or component is essential. The invention is defined only by the claims.

Depending on the context of its use, the term "item" may refer to an item itself (e.g., a product that can be purchased or a web site that can be accessed), or to an identifier or other representation of that item in a computer (e.g., a product or web site identifier or description stored in a database). In some cases, the term may be used collectively to refer to both.

I. Use of Clustering to Select Recommendation Sources (FIGS. 1 and 2)

Figure 2:
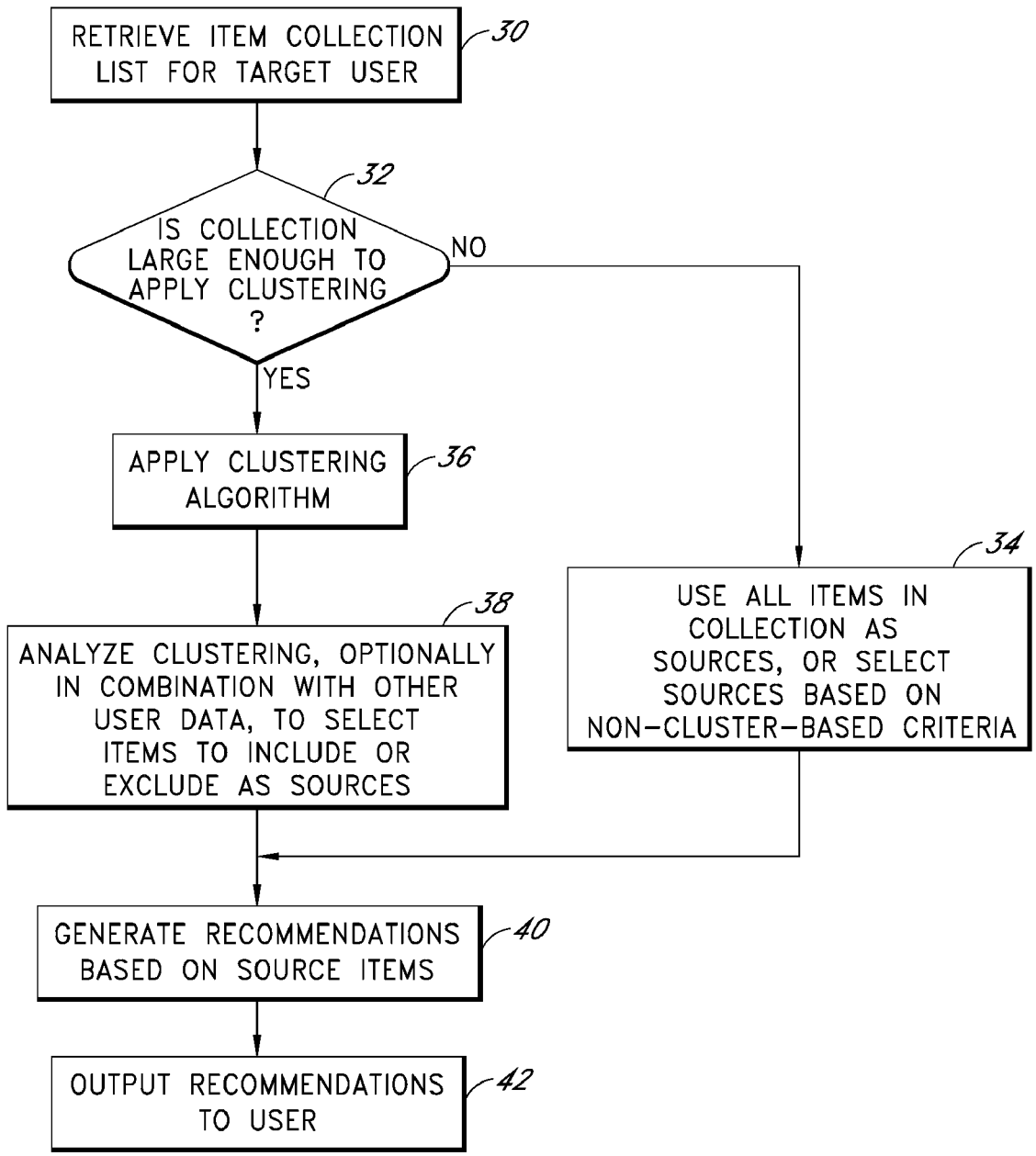
FIG. 2 illustrates a process for selecting recommendation source items from the user's item collection.

FIG. 1 illustrates a target user's collection of items as organized into six clusters, C1-C6, and will be used to explain how clustering can be used to assess user interests and to select items to use as recommendation sources. The processes described in this section may be implemented by a computer system that implements, or makes calls to, a recommendation engine or service. The primary goal of these processes is to automatically identify the items that likely do not fall within one of the target user's areas of interest (e.g., items purchased as gifts), and to refrain from using these items as recommendation sources. By excluding these items, the quality or utility of the recommendations can be significantly improved.

In the particular example shown in FIG. 1, the collection consists of items purchased by the user, and each point represents a purchased item. As discussed below, the collection may also include items rated, but not necessarily purchased, by the user. In addition, the collection may additionally or alternatively be based on other types of item "selection" actions (e.g., rentals, views, downloads, shopping cart adds, wish list adds, subscription purchases, etc.). The distance between each pair of items (points) in FIG. 1 represents the calculated degree to which the items are similar, with relatively small distances representing relatively high degrees of similarity.

Any appropriate distance metric(s) can be used for item clustering. For example, if the items are represented in a hierarchical browse structure such as a directed acyclic graph, each item may be represented as a vector of the browse nodes or categories in which it falls. (As is known in the art, a browse node represents a particular category or other grouping of items, and is typically associated with a particular category name.) The respective vectors of two items can then be compared to compute the distance between the items. When comparing such vectors, the amount of weight given to each browse node is preferably inversely proportional to the number of items falling under that browse node, such that relatively narrow or low-level browse nodes are given more weight. A specific example of how a hierarchical browse structure can be used to calculate item distances is provided below in Section V.

The distances between the items may additionally or alternatively be calculated based on other criteria. For example, the distance between two items, A and B, may be calculated based on any one or more of the following: (a) the relative frequency with which A and B co-occur within purchase histories of users, (b) the relative frequency with which A and B co-occur within item viewing histories of users, (c) the relative frequency with which users tag A and B with the same textual tag, (d) the relative frequency with which A and B co-occur within results of keyword searches, (e) the degree to which A and B contain or are characterized by common keywords. The foregoing are merely examples; numerous other criteria may be used to calculate the item distances.

The six circles shown in FIG. 1 represent the cluster centers, and the lines identify the cluster to which each item is assigned. The clusters may be generated using any appropriate type of clustering algorithm that uses item distances to cluster items. Examples include K-means, IsoData, nearest neighbor, and hierarchical type clustering algorithms. The clusters formed by such algorithms are mutually exclusive, meaning that each item is assigned to a single cluster. Specific examples of suitable clustering algorithms are described below in Sections VI-VIII.

In the example shown in FIG. 1, the user's purchase history is characterized by three relatively large clusters, C1, C2 and C5, and three relatively small clusters, C3, C4 and C6. Because C3, C4 and C6 are relatively small and are somewhat distant from the larger clusters, an inference may be drawn that some or all of the items in these clusters represent gift purchases, or represent purchases that otherwise fall outside the user's areas of interest. (Such an inference may not be suitable, however, if the small cluster is dominated by recent activity, suggesting a possible new interest for the user.) Thus, these "outlier" items, or items of outlier clusters, may be ignored (not used as sources), or possibly given less weight, when generating recommendations for the user. By excluding these items, the quality or utility of the recommendations can be significantly improved.

In practice, the outlier items and/or clusters may be identified and excluded programmatically based on one or more selected criteria. For instance, an item may be treated as an outlier and excluded if some or all of the following conditions are met: (a) the item falls in a cluster having less than some threshold number of items, such as 5; (b) this cluster is significantly smaller than the largest cluster (e.g., less than 10% of its size); (c) the item is some threshold distance from the nearest non-outlier cluster, (d) the item falls in a cluster that consists primarily of items rated below a selected threshold by the target user; (e) the item falls within a cluster having a cluster score that falls below some threshold, where the score generally represents the likelihood that the cluster represents an interest of the user. Other cluster attributes, such as scatter and homogeneity, may also be taken into consideration. In one embodiment, the assessment of outlier interests is performed only at the cluster level, and not the item level.

Rather than merely excluding the outlier items as sources, they may be subjected to greater scrutiny to determine whether they should be excluded. This may be accomplished by, for example, analyzing additional information regarding the particular user and/or affiliated users. The following are examples.

1. Purchase date analysis. The purchase dates of the items may be taken into consideration in various ways. As one example, if most or all of the items in a given outlier cluster were purchased a relatively long time ago, an inference may be drawn that the outlier cluster represents a past interest of the user, or represents an interest of a past acquaintance of the user. As another example, if most or all of the items in an outlier cluster were purchased during a holiday season, or were purchased on approximately the same date over two or more years, the items in the outlier cluster may be excluded on the basis that they likely represent gift purchases.

2. Comparison with known gift purchases. If the user has explicitly designated certain purchases of gifts, a determination can be made whether these known gift purchases correspond to particular clusters. This can be accomplished in various ways. For example, the known gift purchases can be excluded during the clustering process, and the distances between the resulting clusters and the known gift items can be computed and compared. If the known gift purchases tend to correspond to one or more particular clusters, these clusters more likely (but not necessarily) represent gift purchases that should be ignored. As another example, the known gift purchases may be included with the user's other purchases during cluster formation. If any resulting cluster primarily contains known gift purchases, all items in that cluster may be excluded or given less weight, or the cluster may be analyzed based on other criteria to assess whether it represents an interest of the target user 3. Comparison with "not interested" items. Some web sites enable users to explicitly indicate that they are not interested in particular items being recommended to them. For users who use this feature, the items marked as "not interested" can be used in the same manner as known gift purchases (see #2 above) to assess whether particular clusters should be excluded.

4. Comparison with purchase histories of known gift recipients. If the target user has explicitly purchased an item as a gift for a particular recipient whose purchase history is known, clustering can be applied to the purchase history of the known gift recipient. If one of the target user's clusters is close to (e.g., within a threshold distance of) one of the recipient's clusters, the target user's cluster may be treated as likely representing undesignated gift purchases for this same recipient. The items in that cluster may thus be excluded (not used as sources).

The foregoing and other criteria can be used in any appropriate combination to assess whether particular items in the user's purchase history (or other collection) should be used as sources. For example, each cluster or item (or each outlier cluster or item) can be scored based on multiple criteria, including some or all of the criteria listed above. The resulting scores can then be used to select particular items to include or exclude as recommendation sources. This process (including application of the clustering algorithm) may be performed in real time when a user requests recommendations, or may be performed off-line in response to certain events, such as purchase events.

As will be appreciated by the foregoing, the criteria used to analyze the clusters may vary significantly based on the type of collection being analyzed. For example, the analysis performed on a collection that includes or consists of items rated but not purchased by the user will typically be different from the analysis performed on a collection that consists of purchased items. The criteria used may also depend largely on the types of items involved (e.g., physical products, web sites, articles, etc.).

FIG. 2 illustrates a generalized sequence of steps that may be performed by a computer system, such as one or more physical servers of a web site system, to implement the foregoing process. As depicted by block 30, the relevant item collection for the target user is initially retrieved. This collection may, for example, include or consist of items the target user has purchased, rented, viewed, downloaded, rated, added to a shopping cart, or added to a wish list. The items may be products represented in an electronic catalog, or may be some other type of item (e.g., web sites) that is amenable to clustering.

As depicted in block 32, the computer system may then determine whether the collection is sufficiently large (e.g., at least 40 items) to apply a clustering analysis. If it is not, the entire collection may be used as the recommendation sources, or some other criteria (e.g., purchase dates, item sales ranks, etc.) may be used to select the sources from the collection. Assuming the collection is sufficiently large, an appropriate clustering algorithm is used to subdivide the collection into multiple clusters (block 36). As part of this step, distances between the items may be computed using any appropriate metric.

In block 38, the resulting clusters are analyzed-optionally in combination with other user data such as purchase dates, item ratings, and/or known gift purchases-to select particular items to include or exclude as sources. This may be accomplished in numerous ways. As one example, a score may be generated for each cluster, and these scores may be used to select the clusters from which the source items are obtained. The cluster scores may be based on a variety of factors, such as some or all of the following: (1) the number of items in the cluster, (2) the distance of the cluster from other clusters, (3) the cluster's homogeneity, (4) the ratings, if any, of items included in the cluster, (5) the purchase dates, if any, of the items in the cluster, (6) if applicable, the extent to which the items that the cluster contains are close to items that represent known gift purchases. The sources may, for example, be selected from the highest scored clusters only, with additionally item-specific criteria optionally used to select specific items from these clusters. Alternatively, the sources may be selected such that the probability that a given item will be selected is directly proportional to the score of the cluster in which that item falls.

As another example, a score may be assigned to each item in the collection (or only to those identified as outliers), and these scores may be used on an item-by-item basis to select items to include/exclude. The item scores may, for example, be based on both the cluster-based and non-cluster-based criteria described above. If all of the items are scored, some pre-selected number (e.g., 64) of the most highly scored items may be selected for use as the sources, with this number being selected so as to regulate the load placed on the recommendation engine/service.

In block 40, the selected source items are used to generate recommendations for the target user. In one embodiment, this step involves passing a list of source items, optionally together with item weights, to a recommendation engine. The item weights, if provided, may be based on the purchase dates of the items (if applicable), the user's ratings of the items (if rated), and/or some other criteria. The recommendation engine then uses this list to generate and return a ranked list of recommended items. The recommendations may, for example, be generated as described in U.S. Pat. No. 6,912, 505, which is hereby incorporated by reference in its entirety, although other types of recommendation processes can be used. The ranked list of recommended items, or an appropriately filtered version of this list (e.g., with items already purchased by the user removed), is then presented to the target user (block 42).

As mentioned above, the entire process depicted in FIG. 2 may optionally be performed in real time in response to a user request for recommendations. For example, the process may be executed when a user clicks on a link which reads "view your recommendations," or when the user accesses a particular page that is configured to display personalized recommendations.

II. User Management of Item Collection at Cluster Level (FIG. 3)

In addition or as an alternative to automatically selecting items to use as sources, the user may be given the option to manage the collection at the cluster level. For example, the system may include a user interface that displays each cluster and allows the user to exclude an entire cluster (i.e., all of its items) from consideration in generating recommendations. The user interface may additionally or alternatively enable the user to tag an entire cluster (and thus all of its items) with an appropriate label, such as a label that represents the corresponding interest or that identifies a particular family member. Where such tagging functionality is provided, the system also preferably enables the user to request "tag-specific" recommendations as described in U.S. application Ser. No. 11/281,886, filed Nov. 17, 2005, the disclosure of which is hereby incorporated by reference in its entirety.

Figure 3:
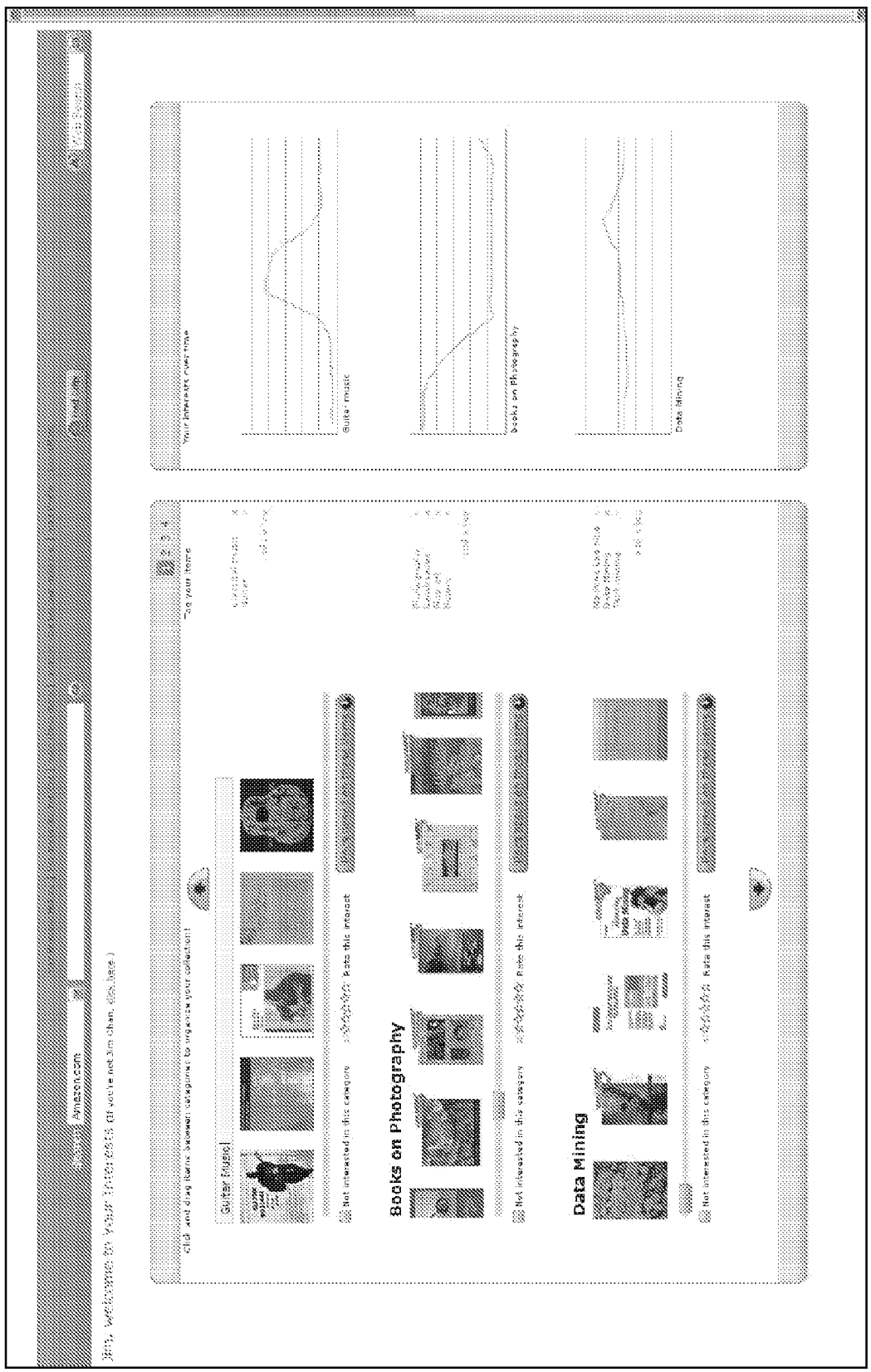
FIG. 3 illustrates one example of a collection management user interface.

FIG. 3 illustrates a web page that represents one example of such a "collection management" user interface. The left pane 50 of the web page displays clusters of items purchased by the user (three clusters shown, each referred to as a "category"). The clusters may be generated by applying an appropriate clustering algorithm to the user's purchase history or other collection, as described above.

Each cluster/category has a name, which may initially be set by the system to the name of the browse node most closely associated with the cluster, and which may be modified by the user. Where a given cluster is too large to be concurrently displayed on the page, a scroll bar 52 is provided for scrolling through the cluster horizontally. Additional clusters/categories can be viewed by selecting the arrow 54 at the bottom of the pane 50.

The interface enables the user to drag-and-drop items to move them between clusters/categories. If a user reassigns an item to a new cluster/category, this reassignment may be maintained if/when the user's collection is later re-clustered. This may be accomplished by utilizing one of a variety of constraint-based clustering algorithms to maintain the user's manual assignments while augmenting them with the automatically computed clustering. The ability to move items between categories may alternatively be omitted.

The web page shown in FIG. 3 also includes controls for rating each category/cluster on a scale of 1-5 or with a "not interested" rating. The category-level ratings applied via these controls preferably do not override any pre-existing item-level ratings assigned by the user. If the user marks a category as "not interested," none of the items in that category will be used as sources. If the user rates a category on a scale of 1-5, the category-level rating may be used as a default rating for any unrated items in that category/cluster. The resulting item ratings may be used both to select items to use as recommendation sources (with highly rated items generally given preference), and to determine how much weight to give to particular source items when generating the recommendations. Instead of providing a "not interested" cluster rating option, a checkbox may be provided for the user to explicitly indicate that a particular cluster should not be used to generate recommendations.

The collection management user interface of FIG. 3 also enables the user to tag an entire category/cluster to more efficiently add tags to the items in that category. In this particular example, the tags "classical music" and "guitar" have already been assigned to the first category, and the user can click on "add a tag" to add a new tag, or on the 'x' to the right of the tag to remove it. Tags can also be added at the item level, and a given item can have any number of tags. Through a separate user interface (not shown, but described in U.S. application Ser. No. 11/281,886, referenced above), the user can request recommendations that are specific to a given tag. For example, if the user has assigned the tag "books for my kids" to ten specific book titles, and requests recommendations based on this tag, these ten book titles will be used as the sources for generating the recommendations.

The cluster-level ratings, tags, and names that are assignable via the UI are all examples of cluster-level metadata that can be attached to the item collection. As illustrated by the above examples, the ability to attach cluster-level metadata improves the system's ability to provide useful recommendations to users.

For each cluster, the web page in FIG. 3 also displays a corresponding "recs based on these items" button. Selection of such a button causes the system to immediately generate and return recommendations that are based solely on these items. In other words, the items in the cluster are passed to the recommendation engine/service as the recommendation sources. If some of these items have been rated by the user, these ratings may be used by the recommendation service as item weights. Because the recommendations are specific to a particular cluster or interest selected by the user, they are very likely to be useful.

The right pane 56 in FIG. 3 displays, for each category/cluster, the user's level of interest in the category as a function of time. This gives the users insight into their own purchasing patterns over time. The levels of interest may, for example, be based on the user's purchase activity. In one embodiment, if the user hovers the mouse cursor over a particular item in the left pane 50, the right pane 56 displays a marker indicating the location (time) of purchase in the associated graph. The graphs can be generated by computing the normalized distribution of items in the respective clusters for each point in time, giving the users an idea of their relative interest at that time. Another possibility for the graph would be to generate box and whisker plots for each of the clusters, based on the timestamps of the items in the cluster. Such a graph would show abrupt shifts in interests, for example. The display of such an interface may be optional or configurable by the user.

III. Cluster-Based Filtering of Recommendations (FIG. 4)

Another feature of some embodiments involves the use of clustering to filter the recommendations generated by a recommendation service or engine. The goal of this feature is to improve the quality of the recommendations by filtering out items similar to those in which the user is "known" to lack interest. This is preferably accomplished by clustering together items the user has marked/rated as "not interested," and then filtering out any recommended items that are similar/close to the resulting "not-interested" cluster or clusters.

Figure 4:
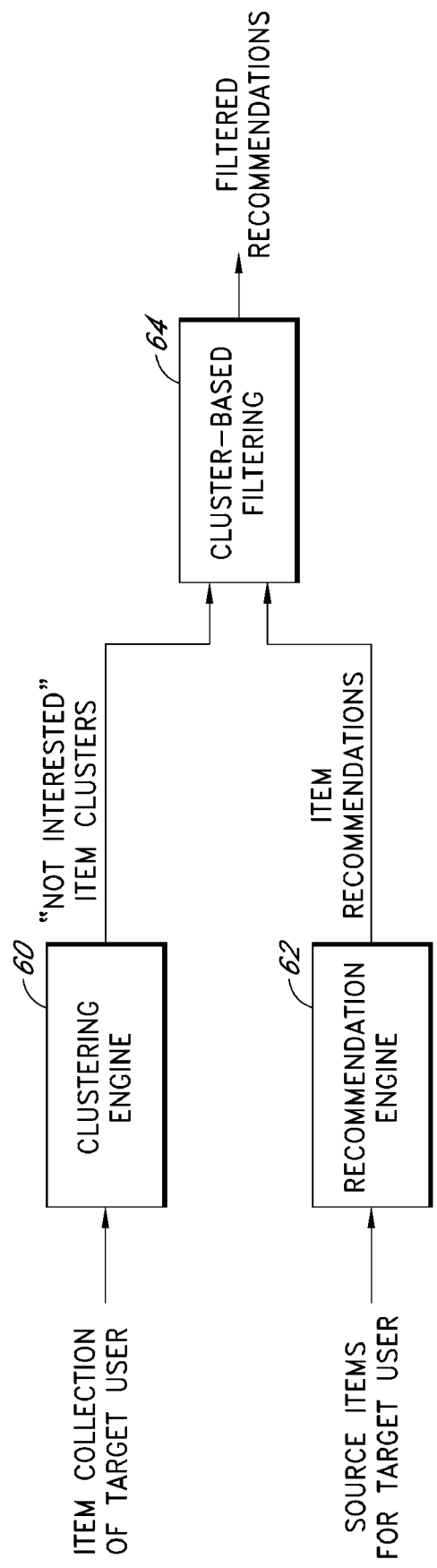
FIG. 4 illustrates a cluster-based process for filtering the output of a recommendation engine.

FIG. 4 illustrates one embodiment of this process. As illustrated, an appropriate collection of items associated with the target user is initially passed to a clustering engine 60. This collection preferably includes or consists of items marked/rated by the target user as "not interested," although other indicia of the user's lack of interest may be used (e.g., ratings falling below a threshold level). The clustering engine 60 applies an appropriate clustering algorithm to this collection, and returns a set of data describing the resulting clusters. The clustering engine 60 may, but need not, use the distance metric and clustering algorithms described in Sections V-VIII below.

If the collection to which clustering is applied consists of items rated as "not interested," the clusters returned by the clustering engine 60 are the not-interested clusters used for filtering. If, on the other hand, the collection includes or consists of other types of items (e.g., items purchased and/or rated on a scale of 1-5 by the user), the resulting clusters are analyzed to identify the clusters, if any, that can be classified as a not-interested clusters. For example, a cluster may be treated as a non-interested cluster if it consists primarily of items rated as "not interested" or rated at less than a threshold level. The methods described in Section VIII for reducing "high entropy" clusters may optionally be used to generate the not-interested clusters.

As further illustrated in FIG. 4, a set of source items is passed to a recommendation engine 62. The set of source items may, for example, include or consist of items purchased or rated highly by the user, and preferably does not include any of the not-interested items. The set of source items may, but need not, be selected using the process described in Section I. As with the other features described herein, the recommendation engine 62 may use a number of recommendation methods, such as, but not limited to, those described in U.S. Pat. No. 6,912,505, to select items to recommend. A recommendation engine that uses traditional collaborative filtering methods may also be used.

The next phase of the process shown in FIG. 4 involves the use of a filtering component or system 64 to filter out any recommendations that are similar to any of the not-interested clusters. This may be accomplished by, for example, measuring the distances between the recommended items and the cluster centers of the not-interested cluster(s), and removing any recommended items that fall within a threshold distance of one of these cluster centers. By removing these items, the likelihood that the recommendations will be useful to the user is significantly increased.

The distances between these items and the centers of the user's "interest clusters" (i.e., clusters designated as representing the target user's interests) may also be considered. With this approach, the decision whether to filter out a recommended item may be based on both (1) the distance between that item and the center of the closest not-interested cluster, and (2) the distance between that item and the center of the nearest interest cluster. For instance, the recommended item may be filtered out if its distance to the center of the closest not-interested cluster is both (a) less than a selected threshold, and (b) less than its distance to the center of the nearest interest cluster. Various other factors, such as the sizes of these clusters, may also be considered.

The process of FIG. 4 can be implemented without using "not interested" ratings to identify the items in which the user lacks interest. For example, the not-interested clusters can be identified based on items explicitly marked as gifts, and/or based on items to which the user has given a rating less than a designated threshold.

Figure 6:
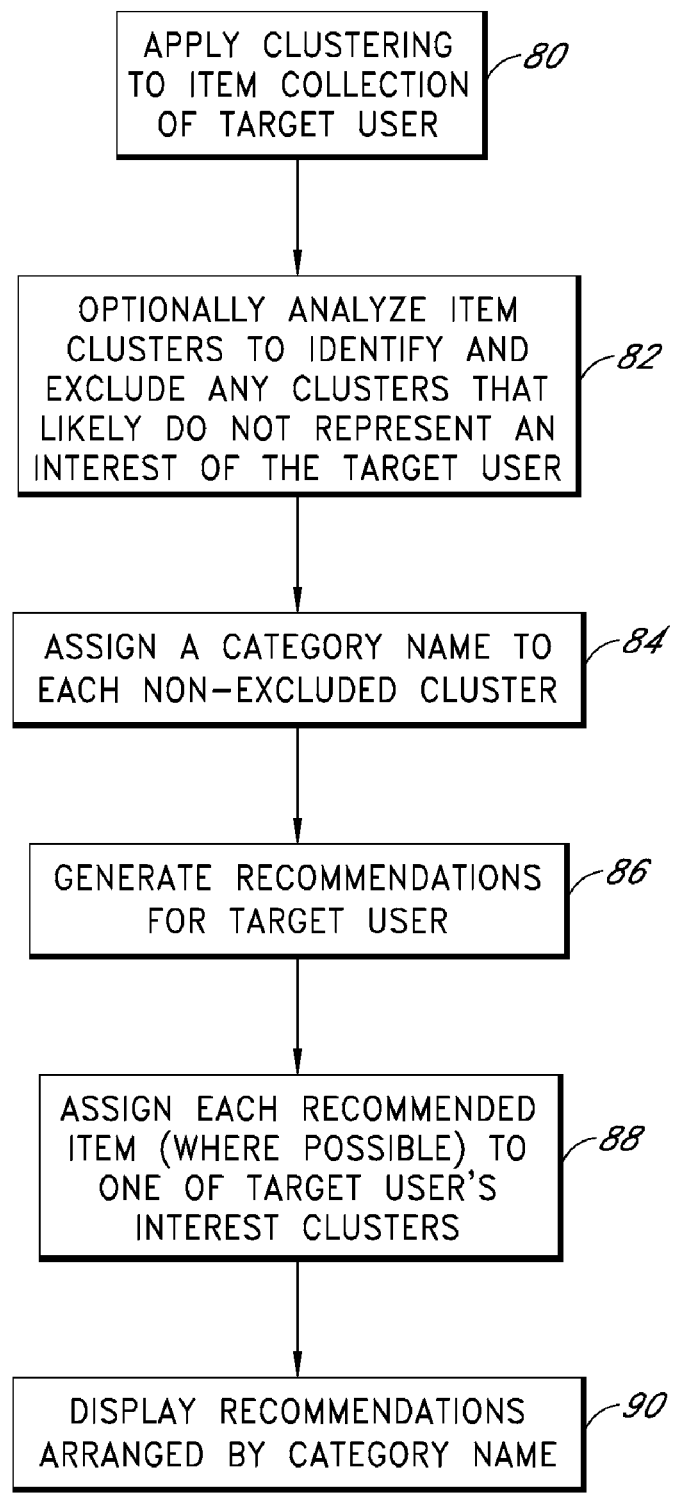
Figure 7:
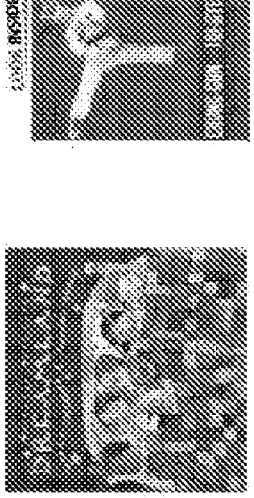
FIG. 7 illustrates a portion of a web page showing an example browse cloud interface that may be used to organize a set of recommended items into cluster-based categories.

IV. Cluster-Based Organization and Display of Recommendations (FIGS. 5-7)

Another feature of some embodiments involves the use of clustering to organize a set of recommended items into categories for presentation to the user. Each category may correspond uniquely to a particular cluster, and may automatically be named based on attributes of the items falling in that cluster. This feature may, but need not, be used in combination with one or more of the features described in Sections I-III.

Figure 5:
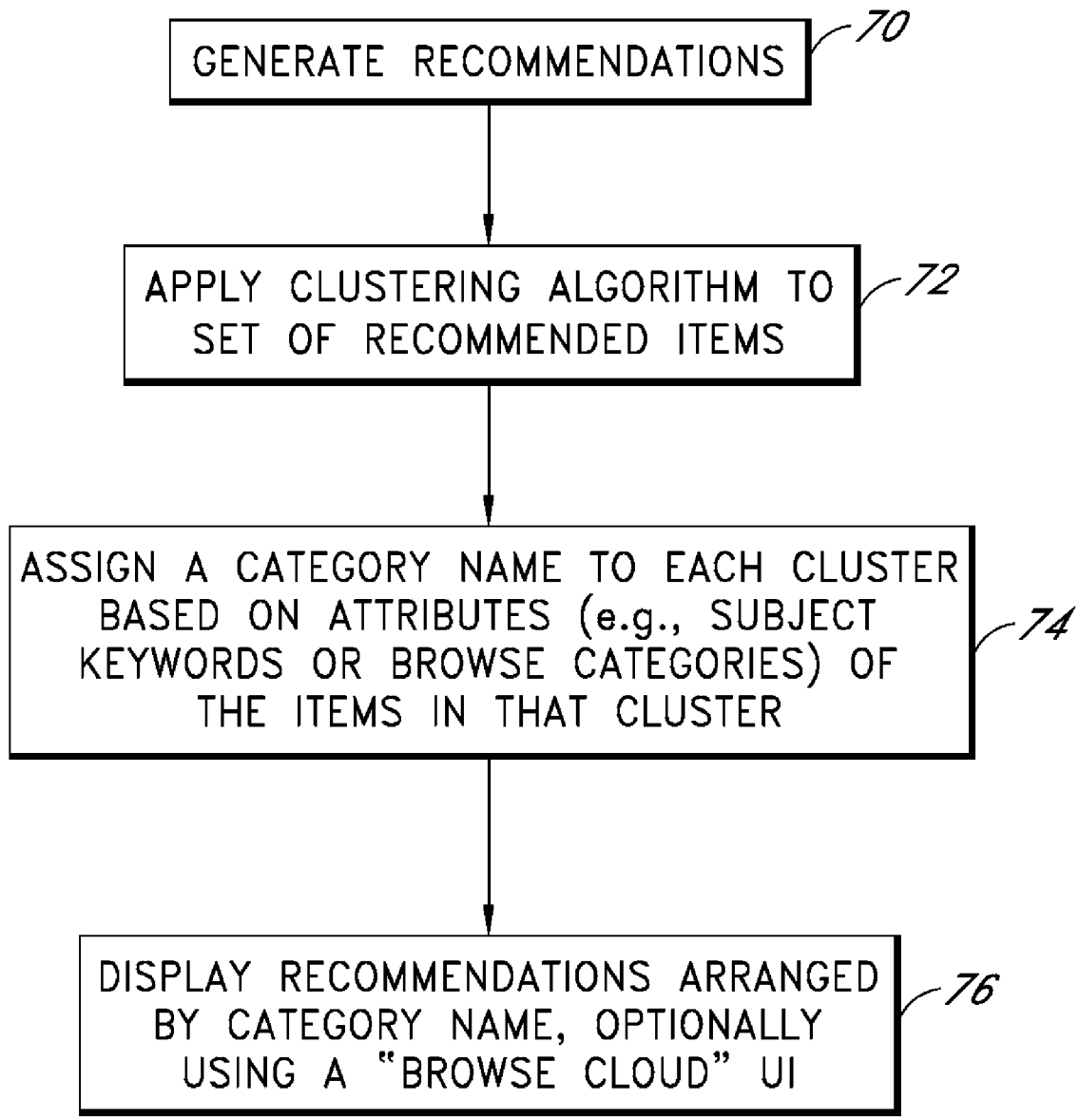
FIGS. 5 and 6 illustrate processes for organizing a set of recommended items into cluster-based categories for presentation to users.

FIG. 5 illustrates this process according to a first embodiment. In step 70, a set of recommended items is generated for a user. The recommendations may be generated using any type of recommendation engine and process, including the various processes described herein. In step 72, a clustering algorithm is applied to the set of recommended items. The clusters may, but need not, be formed using the distance metric and clustering algorithms described in Sections V-VIII.

In step 74, a category name is assigned to each cluster based on attributes of the items in that cluster. This may be accomplished in various ways. For example, if the items are arranged within a hierarchical browse structure, the name of the lowest level category/browse node common to all items in the cluster may be used. As another example, if subject keywords or keyword phrases are available for the items, the subject keyword or keyword phrase that appears the most frequently within the cluster may be used. Additionally, if the user has manually chosen a name for the cluster via some UI such as the one proposed in Section II, it is preferable that the user's selected name have priority over any automatically generated one. The names may be assigned such that no two clusters are assigned the same name.

In the case of keywords or subject terms, data may be obtained from a catalog or extracted from user tags. Tags may be extracted from the target user's tags, or from other users who have similar clusters. One method of choosing which terms to use is to run a type of part-of-speech tagging algorithm on the keyword/subject term phrases, and extracting only nouns. These extracted words can then be weighted based on the frequency of their occurrence in an item catalog or some other source. For example, in the case of books, the actual text of the books may be used to evaluate the relevancy of the keyword.

In step 76, the recommended items, as arranged by cluster/ category, are output to the user together with the associated category names selected in step 74. This may be accomplished in various ways. For example, the category names can be presented in a "browse cloud" interface in which each category name is displayed as a selectable link to the corresponding list of items, and in which the font size of each such name/link is directly proportional to the number of items in the corresponding category/cluster (see FIG. 7, discussed below). Alternatively, the recommended items can be displayed in a list format with category headings.

Because the clustering algorithm assigns each item to a single cluster, the categories generated by the process of FIG. 5 are mutually exclusive, meaning that each item appears in only one of the categories. This is a significant benefit over existing browse cloud displays in which the same recommended item will commonly appear in multiple categories of the browse cloud.

FIG. 6 illustrates a second embodiment of a process of arranging the recommended items into mutually exclusive categories or clusters. In step 80, a clustering algorithm is applied to an appropriate item collection of the target user. In the context of a system that supports item sales, this item collection may, for example, include or consist of items purchased and/or rated by the target user. In the context of a news web site, the item collection may, for example, include or consist of news articles viewed (or viewed for some threshold amount of time) by the target user.

In step 82, the clusters resulting from step 80 are optionally analyzed to identify those that likely represent actual interests of the target user. Any of the methods and criteria described in the preceding sections may be used for this purpose. Any clusters identified as likely not representing an interest of the user are excluded from the subsequent steps. The desirability of performing this step 82 may depend on the nature of the item collection. For instance, if the item collection consists of items rated favorably by the target user, this step 82 may be omitted.

In step 84, a category name is assigned to each remaining cluster. This may be accomplished using one of the methods described above for step 74 of FIG. 5.

In step 86 (which can be performed before any of the preceding steps), item recommendations are generated for the target user. The recommendations may be generated using any type of recommendation engine and process, including the various processes described herein. If the recommendations are generated based on a set of source items, the item collection clustered in step 80, or a selected subset of these items, may be used as the sources.

In step 88, the process attempts to match or "assign" each recommended item to one of the interest clusters, and thus to one of the category names, resulting from steps 80-84. This may be accomplished by, for example, calculating the distances between the recommended items and the cluster centers, and assigning each recommended item to the interest cluster whose distance is shortest. Other factors, such as the sizes and entropy levels of the interest clusters, may also be considered. The effect of this step 88 is to subdivide all or a portion of the set of recommended items into multiple clusters, each of which corresponds to a previously-identified interest of the user. Recommended items that are more than a threshold distance from the closest interest cluster may be filtered out (not displayed), or may be displayed under a category name (e.g., "more recommended items" or "all categories") that does not correspond to any particular interest cluster. The filtering process shown in FIG. 4 and described above may also be used to assess whether particular recommended items should be filtered out.

In step 90, the recommended items (excluding any that have been filtered out), as arranged by interest cluster/category, are exposed to the user in association with the corresponding category names selected in step 84. As mentioned above, a browse cloud interface may optionally be used for this purpose.

FIG. 7 is a screen display illustrating one example of a browse cloud interface that may be used. In this example, the images and titles of the recommended items in all categories are displayed in a scrollable format in the upper portion of the display. If the user wishes to filter the recommendations by category, the user can click on one of the category names (e.g., "Action & Adventure," or "Humorous") in the lower portion of the display. With the exception of "All Categories," each category name/link corresponds to a particular cluster of items. The text size of each such category name is generally proportional to the number of recommended items in the associated cluster. If, for example, the user clicks on "Action & Adventure," the upper portion of the display will be updated to show only the items falling in the corresponding cluster.

Figure 8:
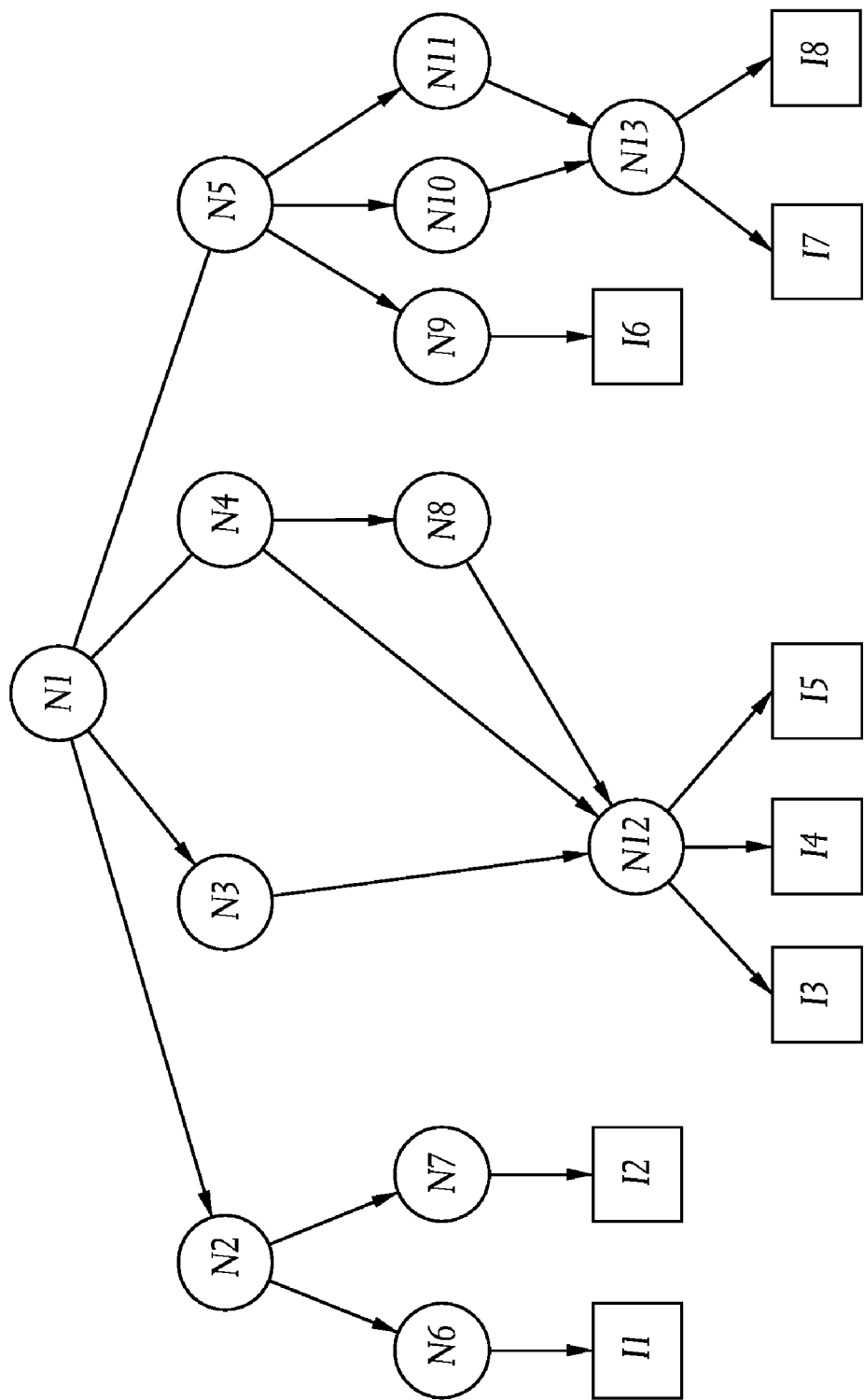
FIG. 8 illustrates an example hierarchical browse structure.

V. Calculating Item Distances Based on Item Locations in a Browse Structure (FIG. 8)

This section describes one possible distance metric that can be used to calculate distances between items. This distance metric may be used where the items being clustered are arranged in a hierarchical browse structure, such as a directed acyclic graph. As discussed above, the distances may additionally or alternatively be calculated based on other criteria.

The distance metric is based on the degree to which two items fall under or "share" the same browse nodes, with greater weight given to lower-level nodes (those containing smaller numbers of items). For example, suppose that the paths to two items, A and B, are as follows (it is assumed in this simple example that there is only one path to each item):

Products>Books>Reference>Business Skills>Public Speaking>Item A

Products>Books>Reference>Business Skills>Typing>Item B

In this example, the "Business Skills" browse node (i.e., the lowest level browse node shared by the two items) would be given the most weight in calculating the distance between A and B, and the "Products" browse node would be given the least weight. More specifically, the weight given to each of the three shared browse nodes would be inversely proportional to the total number of items falling below that browse node. In a more typical scenario, multiple paths will exist to a given item, and each such path should be taken into consideration.

Given two items, A and B, we define the similarity between them to be:

$$\text{similarity}(A, B) = \frac{\sum_{w \in A \cap B} \frac{1}{P(w)}}{|A \cup B|}$$

Intuitively, the numerator means that the more nodes the two items have in common, the more similar they are to each other. The intersecting nodes are also weighted by the inverse probability of the individual nodes, w. Nodes of low probability (e.g., leaf nodes) are assumed to carry more information, and thus will increase the size of the numerator. The denominator normalizes the score based on the size of the union, so that shallow parts of the browse hierarchy are not unduly penalized.

To convert the similarity into a distance metric, the equation is simply inverted, yielding:

$$\text{distance }(A, B) = \frac{|A \cup B|}{\sum_{w \in A \cap B} \frac{1}{P(w)}}$$

To illustrate how distances can be calculated, consider the browse structure (directed acyclic graph) shown in FIG. 8. This structure includes thirteen browse nodes labeled N1-N13, and includes eight items labeled I1-I8. In practice, the browse structure will typically be much larger (e.g., hundreds to thousands of browse nodes and thousands to millions of items).

To calculate the distances between the items, each item is initially represented as a set of all browse node IDs appearing in the item's ancestry. For purposes of this example, it will be assumed that only one path exists from the root node, N1, to each item. Specifically, it will be assumed that the only path to I3 is <1, 3, 12> (where each number represents a browse node); that the only path to I4 is <1, 4, 12>; that the only path to I5 is <1, 4, 8>; that the only path to I7 is <1, 5, 10, 13>; and that the only path to I8 is <1, 5, 11, 13>. Thus, items I1 through I8 in FIG. 8 are represented, respectively, by the following eight browse node sets or "points:"

$x_1 = <1,2,6>$ $x_2 = <1,2,7>$ $x_3 = <1,3,12>$ $x_4 = <1,4,12>$ $x_5 = <1,4,8,12>$ $x_6 = 1,5,9>$ $x_7 = <1,5,10,13>$ $x_8 = <1,5,11,13>$

Although only one path exists to each item in this example, this need not be the case. For example, item I1 could also appear under browse node N7, in which case it would be represented by $x_1 = <1, 2, 6, 7>$.

To compute the distance between any two points in the dataset, a table of node data values or "probabilities" is first computed. The probability P(w) of any browse node w is preferably calculated as the number of times it occurs in the dataset divided by the number of points in the dataset (since each browse node can only occur once per point):

$$P(w) = \frac{\sum_{x \in X} 1 \text{ if } w \in x}{|X|}$$

For our sample dataset, the probabilities are as shown in Table 1.

TABLE 1

Probabilities table for sample dataset

| | | |
|---|---|---|
| P(1) = 1 | P(2) = ¼ | P(3) = ⅛ |
| P(4) = ¼ | P(5) = ⅜ | P(6) = ⅛ |
| P(7) = ⅛ | P(8) = ⅛ | P(9) = ⅛ |
| P(10) = ⅛ | P(11) = ⅛ | P(12) = ⅜ |
| P(13) = ¼ | | |

Once the browse node probabilities are computed, the distances between any two points in this dataset (and thus items) can be computed. For example, the distance between points $x_4$ and $x_5$ is computed as follows:

$$dist(x_4, x_5) = \frac{|x_4 \cup x_5|}{\sum_{w \in x_4 \cap x_5} \frac{1}{P(w)}}$$

$$= \frac{|\langle 1,4,8,12 \rangle|}{\frac{1}{P(1)} + \frac{1}{P(4)} + \frac{1}{P(12)}}$$

$$= \frac{4}{1 + 4 + \frac{8}{3}}$$

$$= \frac{4}{7}$$

Of the shared nodes in this example, nodes 1, 4, and 12, node 4 is given the most weight (i.e., has a greater effect at lowering the distance measurement) since it appears less frequently than nodes 1 and 12 in the dataset.

For comparison, if we compute the distance between $x_1$ and $x_8$, we will see that the distance is larger, as it should be since the two points only share a single node.

$$dist(x_1, x_8) = \frac{|x_1 \cup x_8|}{\sum_{w \in x_1 \cap x_8} \frac{1}{P(w)}}$$

$$= \frac{|\langle 1,2,5,6,11,13 \rangle|}{\frac{1}{P(1)}}$$

$$= 6$$

The distance function just presented represents one possible way to measure the distance between two arbitrary sets of browse nodes. One variation to this method is to take into consideration the "conditional probabilities" of the browse nodes. The benefits of using conditional probabilities become apparent when the relevant items belong to several parts of the browse hierarchy and some paths should have greater weight than others for a given item.

Consider computing the similarity/distance between the book "Introduction to Algorithms" by Cormen et al., and "Flatland" by Abbott. The browse hierarchies for these two books/items are as follows:

"Introduction to Algorithms"
Qualifying Textbooks—Winter 2007
Subjects>Computers & Internet>General
Subjects>Computers & Internet>Operating Systems>General
Subjects>Computers & Internet>Programming>Algorithms>General
Subjects>Computers & Internet>Programming>General
Subjects>Professional & Technical>Professional Science>Mathematics>Applied>General
Subjects>Science>Mathematics>General
"Flatland"
Subjects>Literature & Fiction>General>Classics
Subjects>Literature & Fiction>World Literature>British>19th Century
Subjects>Professional & Technical>Professional Science>Physics>Relativity
Subjects>Science>Mathematics>General
Subjects>Science>Physics>General
Subjects>Science>Physics>Relativity
Subjects>Science Fiction & Fantasy>Science Fiction>General
Subjects>Science Fiction & Fantasy>Science Fiction>Short Stories These two books are related in that they both belong to the "Subjects>Science>Mathematics>General" ancestry. However, the books are clearly different in that one is a computing reference while the other is a science fiction novel. The distance function described above, however, gives no preference to any of the browse nodes in the browse set, regardless of the distribution of browse nodes within the set.

To account for these per-item distributions, the distance metric is modified by adding conditional terms representing the probability of a browse node given an item, $P(w|x \in X)$, where w is the browse node, and x is some item in the dataset X. Folding this into our distance function yields:

$$\text{distance}(A, B) = \frac{|A \cup B|}{\sum_{w \in A \cap B} \frac{P(w|A)P(w|B)}{P(w)}}$$

In the case where x is an item, the conditional is computed by summing the number of times each browse node appears in the item's ancestry, and dividing by the total number of paths in this ancestry. In the case where x is a cluster center, the conditional is computed by summing the number of times it occurs in all items in the cluster divided by the total number of ancestries in the cluster.

With this modified approach, the amount of weight given to a particular browse node when calculating the distance between one pair of items may be different than the amount of weight given to this same browse node when calculating the distance between another pair of items. For any particular item, more weight is given to the common portions of its ancestry. The more times a particular node appears in the different ancestry paths, the more weight it will contribute to the distance computation. This will discourage linking items together based on rather obscure assignments, making the distance computation more robust to some of the more questionable assignments in the browse tree.

The item distances may be calculated by a distance calculation system or service component that is part of a larger system. Once distances have been calculated and stored for all pair of items, the stored distance values may be used by an appropriate clustering algorithm to cluster together similar items.

VI. Example Clustering Algorithm

This section describes one possible clustering algorithm that may be used to implement the clustering phases of the various processes described above. The algorithm is referred to herein as IsoModes, and is a variation of the well known IsoData clustering algorithm. As will be recognized, the IsoModes algorithm is one of many algorithms that can be used. The IsoModes algorithm can be applied using the distance metric of Section V or any other distance metric.

By way of background, IsoData stands for "Iterative Self-Organizing Data Analysis Technique." It is self-organizing in that it differs from standard clustering techniques such as K-Means, where the number of clusters must be pre-specified. Since the number of clusters is generally unknown, IsoData attempts to automatically determine this number by optimizing other criteria, such as the ratio of inter-to-intra cluster scatter.

Intra-cluster scatter is defined to be the total sum of distances from points in a cluster to the cluster center. That is:

$$S_{internal} = \sum_{x \in A} dist(A, A_C).$$

$S_{internal}$ is the internal scatter, A is the cluster, and $A_C$ is the cluster center. Inter-cluster scatter is the sum of the distances from cluster centers to the global mean. Intuitively, maximizing the ratio of inter-to-intra cluster scatter will favor groupings where the points within a cluster are similar to each other, and points from different clusters will be separated as much as possible.

The optimization process is done by repeatedly assigning points to their nearest cluster and re-computing the cluster centers. At the end of each iteration, clusters which have very large scatter are split, and clusters which are too close to other clusters are broken up and reassigned to existing clusters. This procedure is repeated until the total scatter converges to within some margin of error, there is no change in the clustering in consecutive iterations, or some maximum number of iterations has been reached. If the distance metric of Section V is used, the cluster centers are preferably defined as sets of browse nodes, so the points and centers are fundamentally the same and are directly comparable.

One significant difference between IsoModes and the classical IsoData algorithm is in the method used to split large clusters. In Euclidean space, a cluster with large scatter can be split in the direction of the largest eigenvector. This will maximize the separation of items when splitting the cluster. However, for nominal data, there are no notions of eigenvalues or eigenvectors, so the cluster split is not something that can be directly computed. One solution in this case is to run the 2-Modes algorithm, which is basically K-means for nominal data, where k=2. The 2-Modes algorithm is very similar to IsoModes, except that the number of classes is simply predetermined to be 2, giving us our desired 2-way cluster split. Another minor difference between IsoModes and IsoData is in the stopping criterion; instead of stopping when the global scatter falls below some epsilon, it is stopped when the clustering stops changing. This is desirable because, among other reasons, it is very easy for the global mean to become degenerate when computing the center for nominal data.

A pseudocode representation of the IsoModes algorithm is provided in Table 2.

TABLE 2

IsoModes Clustering Algorithm

INPUTS:
    data = set of points
    k = initial estimate of K (number of clusters)
    θ = scatter threshold for splitting clusters
    σ = minimum distance to other clusters for reassignment
    N = limit on maximum number of iterations
IsoModes(data, k, θ, σ, N):
    <<Pick K random points to initialize the cluster centers>>
    $CC_0$ = pickKRandomPoints(data, k )
    $C_0$ = assignPointsToClusters( $CC_0$, data)
    i = 1
    hasChanged = true
    <<Loop until clusters unchanged, or maximum number of iterations met>>
    while hasChanged and i < N:
        $CC_i$ = computeClusterCenters( $C_{i-1}$ )
        $C_i$ = assignPointsToClusters( $CC_i$, data)
        for each cluster $c_j \in C_i$:
            d = distanceToClosestCluster( $CC_i$ )
            if scatter ($c_j$) > θ:
                <<Splitting the clusters is done via 2-Modes clustering>>
                splitCluster( $c_j$, $CC_i$ )
            else if d < σ:
                reassignPointsToOtherClusters( $c_j$, $CC_i$ )
        i = i + 1
        hasChanged = ($C_i \ne C_{i-1}$)

The cluster centers are initialized by randomly selecting k points, and the points in the dataset are assigned to the closest centers. The main iteration begins by re-computing the cluster centers from the previous assignment, and then re-computing the assignment until there is no change in the clustering, or the maximum number of iterations is reached. At the end of each iteration, the algorithm checks all clusters for any with large scatters, or which are too close to neighboring clusters. Clusters satisfying these criteria are split and reassigned as necessary.

VII. Example Application of IsoModes Algorithm

A sample iteration of the IsoModes algorithm is set forth below using the sample browse structure in FIG. 8, and with k=3.

Step 1. Choose 3 random points from the dataset; for this example we will choose the cluster centers CC=<<1,2,6>,<1,2,7>,<1,4,12>>. These will be the initial cluster centers.

Step 2. Compute an initial cluster assignment by assigning all of the data points to the nearest cluster centers. Table 3 displays the computed distances from all points to all clusters. Assignments are denoted with (*). Ties are broken at random.

TABLE 3

| | Cluster center | | |
|---|---|---|---|
| x | <1, 2, 6> | <1, 2, 7> | <1, 4, 12> |
| $\alpha_1$ = <1, 2, 6> | *3/13 | 4/5 | 5 |
| $\alpha_2$ = <1, 2, 7> | 4/5 | *3/13 | 5 |
| $\alpha_3$ = <1, 3, 12> | 5 | 5 | *12/11 |
| $\alpha_4$ = <1, 4, 12> | 5 | 5 | *9/23 |
| $\alpha_5$ = <1, 4, 8, 12> | 6 | 6 | *12/23 |
| $\alpha_6$ = <1, 5, 9> | 5 | *5 | 5 |
| $\alpha_7$ = <1, 5, 10, 13> | *6 | 6 | 6 |
| $\alpha_8$ = <1, 5, 11, 13> | 6 | 6 | *6 |

Step 3. Check to see if clusters have not changed or if we have exceeded the maximum number of iterations.

Step 4. Compute the cluster centers. This is done by taking all nodes that appear in greater than 50% of the points in each cluster computed in the previous step (e.g. Cluster 1 ($c_1$), was assigned <1,2,6> and −1,5,10,13>). The results of this step are shown in Table 4.

TABLE 4

| $c_1$ | | $c_2$ | | $c_3$ | |
|---|---|---|---|---|---|
| ω | P(ω) | ω | P(ω) | ω | P(ω) |
| 1 | *1.0 | 1 | *1.0 | 1 | *1.0 |
| 2 | 0.5 | 2 | 0.5 | 3 | 0.3 |
| 5 | 0.5 | 5 | 0.5 | 4 | 0.3 |
| 6 | 0.5 | 7 | 0.5 | 5 | 0.3 |
| 10 | 0.5 | 9 | 0.5 | 11 | 0.3 |
| 13 | 0.5 | | 0.5 | 12 | *0.6 |
| | | | | 13 | 0.3 |

Step 5. Re-compute the cluster assignments, with ties again broken at random. The results of this step are shown in Table 5.

TABLE 5

| | Cluster center | | |
|---|---|---|---|
| x | <1> | <1> | <1, 12> |
| $\alpha_1$ = <1, 2, 6> | *3 | 3 | 4 |
| $\alpha_2$ = <1, 2, 7> | *3 | 3 | 4 |
| $\alpha_3$ = <1, 3, 12> | 3 | 3 | *9/11 |
| $\alpha_4$ = <1, 4, 12> | 3 | 3 | *9/11 |
| $\alpha_5$ = <1, 4, 8, 12> | 4 | 4 | *12/11 |
| $\alpha_6$ = <1, 5, 9> | 3 | *3 | 4 |
| $\alpha_7$ = <1, 5, 10, 13> | *4 | 4 | 5 |
| $\alpha_8$ = <1, 5, 11, 13> | *4 | 4 | 5 |

Step 6. At this point, the clusters are evaluated to split clusters with very large scatters, or reassign clusters which are too close to other clusters. Even though the first two clusters in this example are too similar to each other, for brevity, we will assume no splits or reassignments occur. In the actual algorithm, one of the duplicate clusters would be removed, with the items randomly distributed among the remaining clusters.

Step 7. Re-compute the centers using assignments from previous iteration. The results of this step are shown in Table 6.

TABLE 6

| $c_1$ | | $c_2$ | | $c_3$ | |
|---|---|---|---|---|---|
| ω | P(ω) | ω | P(ω) | ω | P(ω) |
| 1 | *1.0 | 1 | *1.0 | 1 | *1.0 |
| 2 | 0.5 | 5 | *1.0 | 3 | 0.3 |
| 5 | 0.5 | 9 | *1.0 | 4 | *0.6 |
| 6 | 0.25 | | | 8 | 0.3 |
| 7 | 0.25 | | | 12 | *1.0 |
| 10 | 0.25 | | | | |
| 11 | 0.25 | | | | |
| 13 | 0.5 | | | | |

Step 8. Re-compute cluster assignments. The results are shown in Table 7.

TABLE 7

| | Cluster center | | |
|---|---|---|---|
| x | <1> | <1, 5, 9> | <1, 4, 12> |
| $\alpha_1$ = <1, 2, 6> | *3 | 5 | 5 |
| $\alpha_2$ = <1, 2, 7> | *3 | 5 | 5 |
| $\alpha_3$ = <1, 3, 12> | 3 | 5 | *12/11 |
| $\alpha_4$ = <1, 4, 12> | 3 | 5 | *9/123 |
| $\alpha_5$ = <1, 4, 8, 12> | 4 | 6 | *12/23 |
| $\alpha_6$ = <1, 5, 9> | 3 | *9/35 | 5 |
| $\alpha_7$ = <1, 5, 10, 13> | 4 | *15/11 | 6 |
| $\alpha_8$ = <1, 5, 11, 13> | 4 | *15/11 | 6 |

Step 9. Check again for scatter and minimum distance. In this case, no splits or reassignments occur.

Step 10. Re-compute the centers using assignments from previous iteration. The results of this step are shown in Table 8.

TABLE 8

| $c_1$ | | $c_2$ | | $c_3$ | |
|---|---|---|---|---|---|
| $\omega$ | P($\omega$) | $\omega$ | P($\omega$) | $\omega$ | P($\omega$) |
| 1 | *1.0 | 1 | *1.0 | 1 | *1.0 |
| 2 | *1.0 | 5 | *1.0 | 3 | 0.3 |
| 6 | 0.5 | 9 | 0.3 | 4 | *0.6 |
| 7 | 0.5 | 10 | 0.3 | 8 | 0.3 |
| | | 11 | 0.3 | 12 | *1.0 |
| | | 13 | *0.6 | | |

At this point, the assignments will be recomputed, which will result in the exact same assignments. The clustering has now stabilized and the algorithm will terminate. Note that the groupings have formed into the major sub-graphs of the directed acyclic graph in FIG. 8.

Real-time/Performance Enhancements

One drawback to the IsoModes algorithm is that it is very sensitive to the cluster center initialization. The algorithm is essentially a form of hill-climbing, and as such, the starting point can dictate how many iterations are required to convergence, as well as whether converge to a global optimum is possible. If the wrong starting point is chosen, converge to a local optimum may occur, resulting in a suboptimal clustering.

The issue can be addressed by, among other solutions, performing a type of hierarchical sampling prior to clustering the entire dataset. For example, the system can initially choose a very small sample size of 50 items, run the algorithm, and then use the resulting clustering as a seed to progressively larger samples until the entire dataset is clustered. This technique results in faster convergence in comparison with random initialization.

VIII. Reduction of High Entropy Clusters

Some of the clusters resulting from the IsoModes algorithm may have an entropy (in terms of user like/dislike) that is too high for a given application. A high entropy signifies either that the user has a love/hate relationship with the cluster's items, or that the cluster is too broad and should be split. A low entropy signifies that the user strongly likes or dislikes the items in the cluster.

To address this issue in one embodiment, high entropy clusters are re-clustered using the 2-Modes algorithm described above, except the initial seeding is based on a positive/negative classification of the items. Where sufficient ratings data is available for the particular user, this may be accomplished as follows. Each item in the relevant cluster is initially classified as having a positive rating or a negative rating, or is removed from consideration if no such rating can be assigned. For example, if the user ratings are based on a 5-star plus "non-interested" rating system, items with a 1 or 2 star rating may be classified as negative; items with a 3 or 4 star rating may be classified as positive, and all other items may be disregarded. Once each item has been classified, the cluster's homogeneity may be determined by computing its entropy. This process is summarized by the following equations:

$$f_+(x) = \begin{cases} 1 & \text{if } x \text{ is 4 or 5 star rating, purchased, or owned} \\ 0 & \text{otherwise} \end{cases}$$

$$f_-(x) = \begin{cases} 1 & \text{if } x \text{ is 1 or 2 star rating, not-interested, or excluded} \\ 0 & \text{otherwise} \end{cases}$$

$$p_+(C) = \frac{\sum_{x \in C} f_+(x)}{|X|}$$

$$p_-(C) = \frac{\sum_{x \in C} f_-(x)}{|X|}$$

$$\text{entropy}(C) = -p_+(C)\log(p_+(C)) - p_-(C)\log(p_-(C))$$

This additional cluster splitting criteria enables the system to optimize for low entropy clusters, where the likes and dislikes of the user are more readily apparent.

IX. Example System Architecture (FIG. 9)

Figure 9:
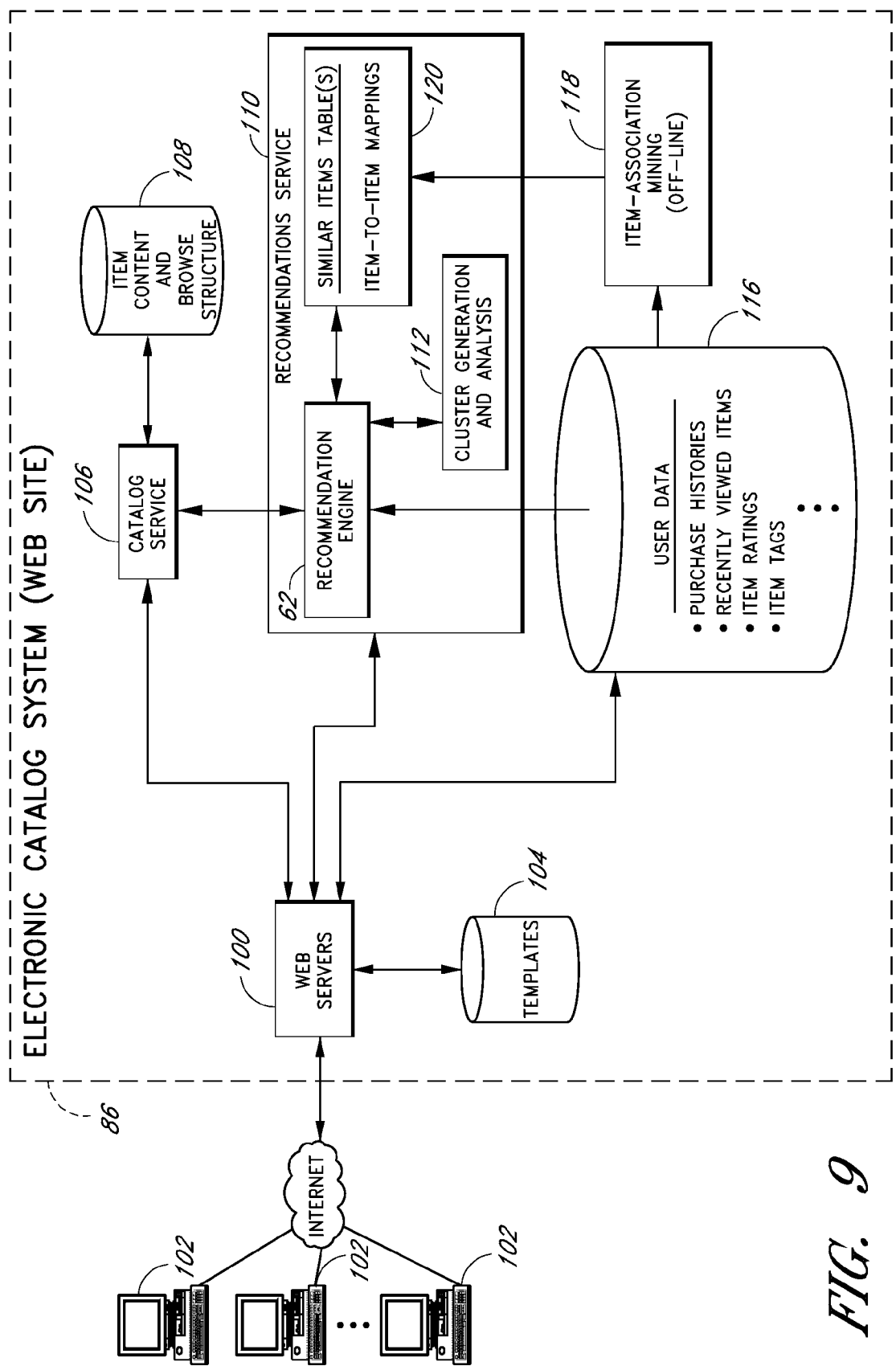
FIG. 9 illustrates one example how the various cluster-related features may be implemented in the context of a web-based electronic catalog system.

FIG. 9 illustrates how the various features described above may be implemented in the context of a web-based system that provides functionality for users to browse and purchase items from an electronic catalog. As will be recognized, the various features of the disclosed embodiments can also be implemented in other types of systems, including, e.g., music download systems that recommend music titles based on users' music download histories, video rental sites that recommend video/DVD titles based on users video rental histories, news sites that recommend news articles based on users' news browsing histories, browser toolbar based systems that recommend web sites and other network resources based on users' web browsing histories, web services for providing recommendations, checkout/wallet services that enable users to pay for goods from various participating merchants, and Internet advertising systems.

The system shown in FIG. 9 includes one or more web server machines 100 that generate and serve pages of a host web site in response to page requests from user computing devices 102. The web servers 100 provide user access to a catalog of items represented in a database 108 or collection of databases. The items preferably include or consist of items that may be purchased via the web site (e.g., book, music and video titles in physical or downloadable form; consumer electronics products; household appliances; magazine and other subscriptions, etc.). The database 108 also stores data regarding how the items are arranged within a hierarchical browse structure. Data regarding the catalog items and the browse structure is accessible via a catalog service 106, which may be implemented as a web service.

The system also includes a data repository 116 (e.g., one or more databases) that stores various types of user data, including identifiers of the items in each user's collection. For example, the data repository 116 may store users' purchase histories, item viewing histories, item ratings, and item tags. The purchase histories and item viewing histories may be stored as lists of item identifiers together with associated event timestamps. The various types of user data may be accessible to other components of the system via a data service (not shown), which may be implemented as a web service.

The system also includes a recommendation service/system 110 that generates recommendations in real time in response to requests from users. The recommendation service 110 includes a recommendation engine 62, and includes a cluster generation and analysis component/system 112 that implements some or all of the clustering-related features described herein, including the calculation of item distances. Separate executable components may optionally be provided for performing, e.g., distance calculations, item clustering, and cluster assessment; these components may all run on a single computer or on separate computers.

Although shown as part of the recommendation service 110, the clustering-related features may alternatively be implemented as a separate service. For example, a separate cluster service can be provided that receives an input list of items (together with appropriate input parameters) and outputs data describing the resulting set of clusters. This same service could, e.g., be configured to select source items from the input list; to assign names to the clusters, to score the clusters, and to perform various other cluster-related tasks.

The recommendation engine 62 may operate as described in U.S. Pat. No. 6,912,505, referenced above. More specifically, the recommendations service may use one or more "similar items" tables/datasets 120 to look up items that are similar or related to the source items, together with associated data values indicating the strengths of such relationships. The similar items table(s) 120 may be generated off-line by an item association mining component 118 that analyzes users' purchase histories, item viewing histories, or some other type of user activity data, and detects and quantifies behavior-based associations between specific items. For instance, if purchase histories are used, item A may be mapped to item B in a purchase-based similar items table 120 if a relatively large number of the users who purchased item A also purchased item B. Other types of recommendation engines, including recommendation engines that do not use item-to-item mappings, may also be used.

The electronic catalog system may also include services for handling various other types of tasks, such as user authentication, transaction processing, search query processing, storing user-assigned tags and ratings, processing of user-submitted sales listings, etc.

The web servers 100 use a data repository of web page templates 104 to dynamically generate web pages in response to browser requests. The templates directly or indirectly specify the service calls that are made to the services to, e.g., request data needed to generate the requested page. For instance, an appropriate template may be provided for generating collection management pages of the type shown in FIG. 3, and for generating item detail pages, browse node pages, recommendation/browse cloud pages of the type shown in FIG. 7, and various other pages of the site.

When a user clicks on a link for viewing recommendations, a web server 100 requests recommendations for the user from the recommendations service 110. The recommendation service 110 then uses all or a portion of the user's purchase history, item ratings, and/or item viewing history (typically depending upon the context of the user's request) to generate the recommendations. As part of this process, the recommendations service 110 may use the cluster-based process described in Section I to select the particular items to use as recommendation sources. The recommendation service 100 may additionally or alternatively use the cluster-based filtering process described in Section III to filter the set of items generated by the recommendation engine 62. Additionally or alternatively, recommendation service 100 may use the process described in Section IV to organize the recommendations into a set of cluster-based categories for display to the user. Regardless of which of these features is/are used, the resulting list of recommended items (or a portion of this list), and/or the names of the cluster-based categories in which these items fall, is incorporated into the requested web page for transmission to the user's browser/computer 102.

The services and other application components 62, 106, 110, 112, and 118 shown in FIG. 9 may be implemented in software code modules executed by any number of general purpose computers or processors, with different services optionally but not necessarily implemented on different machines interconnected by a network. The code modules may be stored in any type or types of computer storage, such as hard disk drives and solid state memory devices. The various data repositories 104, 108, 120 may similarly be implemented using any type of computer storage, and may be implemented using databases, flat files, or any other type of computer storage architecture.

X. CONCLUSION

Each of the processes and algorithms described in the preceding sections may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage, such as those mentioned above.

The various features and processes described above may be used independently of one another, or may be combined in various ways. All possible combinations are intended to fall within the scope of this disclosure.

Although this invention has been described in terms of certain preferred embodiments and applications, other embodiments and applications that are apparent to those of ordinary skill in the art, including embodiments and applications that do not provide all of the benefits described herein, are also within the scope of this invention. The scope of the invention is defined only by the claims, which are intended to be construed without reference to any definitions that may be explicitly or implicitly included in any of the incorporated-by-reference materials.

What is claimed is:

1. A computer-implemented method of measuring the distance between a first item and a second item, the method comprising:
   identifying a first set of one or more paths in a hierarchical browse structure from a root node of the hierarchical browse structure to the first item, said hierarchical browse structure comprising multiple levels of browse nodes arranged in a hierarchy, each browse node representing a respective item category;

identifying a second set of one or more paths in the hierarchical browse structure from the root node to the second item;

identifying a plurality of shared browse nodes for the first and second items, said shared browse nodes being browse nodes that occur in both the first set of paths and the second set of paths, each shared browse node representing a respective item category in which the first and second items are both categorized;

calculating data values for particular shared browse nodes;

calculating a distance value that represents the distance between the first item and the second item such that the distance value is dependent upon at least (a) the number of said shared browse nodes, (b) the total number of browse nodes in the first and second sets of paths, and (c) said data values, such that different amounts of weight are given to different shared browse nodes in calculating the distance value; and storing the distance value in computer storage.

2. The method of claim 1, further comprising using the distance value, in combination with distance values calculated for other pairs of items, as inputs to a clustering process that clusters together items.

3. The method of claim 1, wherein the data value for a shared browse node depends upon how many items fall below that shared browse node in the hierarchical browse structure.

4. The method of claim 1, wherein the data values are calculated, and used to generate said distance value, such that an amount of weight given to a shared browse node is inversely proportional to the number of items falling below the shared browse node in the hierarchical browse structure.

5. The method of claim 1, wherein the data values specify an amount of weight given to corresponding shared browse nodes in calculating the distance value.

6. The method of claim 1, wherein calculating the data values comprises, for a particular shared browse node, calculating a first data value which corresponds to the first item, and calculating a second data value which corresponds to the second item.

7. The method of claim 6, wherein the first and second data values are conditional probability values.

8. The method of claim 6, wherein the first data value is dependent upon the number of paths in said first set of paths.

9. The method of claim 1, wherein the first set of paths comprises a plurality of oaths from the root node to the first item.

10. A computer system comprising one or more computers, said computer system programmed to perform the method of claim 1.

11. A computer-readable medium having stored thereon executable computer code that embodies the method of claim 1.

12. The method of claim 1, wherein the items are products represented in an electronic catalog, and the method is performed by execution of code by one or more computers.

13. A computer system, comprising:

a computer data repository that stores a representation of a hierarchical browse structure for browsing a repository of items, said hierarchical browse structure comprising multiple levels of browse nodes, each browse node representing a particular item category;

a distance calculation system comprising a machine, said distance calculation system configured to calculate distance values representing distances between particular items such that the distance value for a pair of items, item 1 and item 2, depends on (a) a number of browse nodes that are shared by both item 1 and item 2 in the hierarchical browse structure, and (2) weight values calculated for said shared browse nodes, said weight values calculated such that the shared browse nodes are not all weighted equally; and a clustering system configured to use at least the distance values calculated by the distance calculation system to form clusters of related items.

14. The computer system of claim 13, wherein the distance value further depends on how many browse nodes item 1 falls under and how many browse nodes item 2 falls under.

15. The computer system of claim 14, wherein the amount of weight given to a shared browse node by the distance calculation system is inversely proportional to the number of items falling below the shared browse node in the hierarchical browse structure.

16. The computer system of claim 13, wherein the clustering system is configured to use said distance values to divide a collection of items associated with a user into multiple clusters.

17. The computer system of claim 16, further comprising a user interface that provides functionality for the user to assigning a tag to multiple items at a time by tagging a selected one of said clusters, said user interface also providing functionality for requesting item recommendations that are specific to said tag.

18. The computer system of claim 16, further comprising a recommendation system that uses said multiple clusters to assess interests of, and provide recommendations to, said user.

19. The computer system of claim 18, wherein the recommendation system uses the clusters to select items to use as recommendation sources for generating personalized item recommendations.

20. The computer system of claim 16, wherein the hierarchical browse structure comprises a first set of paths from a root node to a first item, and comprises a second set of paths from the root node to a second item, each path comprising multiple browse nodes, and the distance calculation system is configured to calculate a distance value representing a distance between the first and second items such that the distance value is dependent upon at least (a) the number of browse nodes common to said first and second sets of paths, and (b) the total number of browse nodes in the first and second sets of paths.

21. The computer system of claim 20, wherein the distance calculation system is configured to assign data values to particular shared browse nodes, and to use said data values in calculating said distance value.

22. A computer-readable medium having stored thereon executable instructions which, when executed by a computer system, cause the computer system to:

identify a set of shared browse nodes for a first item and a second item that are represented in a hierarchical browse structure, said hierarchical browse structure comprising multiple levels of browse nodes, each browse node representing an item category, said first item accessible via a first set of one or more paths from a root node of the hierarchical browse structure, said second item accessible via a second set of one or more paths from the root node, said shared browse nodes being browse nodes that occur in both the first set of paths and the second set of paths, said first and second sets of paths reflecting categorizations of the first and second items, respectively, in the hierarchical browse structure;

calculate data values for particular ones of said shared browse nodes; and calculate and store a distance value that represents a distance between the first item and the second item such that the distance value is dependent upon at least (a) the number of said shared browse nodes, (b) the total number of browse nodes in the first and second sets of paths, and (c) said data values, such that different amounts of weight are given to different shared browse nodes in calculating the distance value.

23. The computer-readable medium of claim 22, wherein execution of the instructions further causes the computer system to use the distance value, in combination with distance values calculated for other pairs of items, as inputs to a clustering process that clusters together items.

24. The computer-readable medium of claim 22, wherein the data value for a shared browse node depends upon how many items fall below that shared browse node in the hierarchical browse structure.

25. The computer-readable medium of claim 22, wherein the data values are calculated, and used to generate said distance value, such that an amount of weight given to a shared browse node is inversely proportional to the number of items falling below the shared browse node in the hierarchical browse structure.

26. The computer-readable medium of claim 22, wherein the data values specify an amount of weight given to corresponding shared browse nodes in calculating the distance value.

27. The computer-readable medium of claim 22, wherein the first data value is dependent upon the number of paths in said first set of paths.

28. The computer-readable medium of claim 27, wherein the first set of paths comprises a plurality of paths from the root node to the first item.

29. The computer-readable medium of claim 22, wherein the items are products represented in an electronic catalog.

* * * * *